United States Patent
Zhang (10) Patent No.: US 11,888,812 B1
(45) Date of Patent: Jan. 30, 2024

(54) HOST DISCOVERY AND ADDITION METHOD AND APPARATUS IN DATA CENTER, AND DEVICE AND MEDIUM

(71) Applicant: INSPUR SUZHOU INTELLIGENT TECHNOLOGY CO., LTD., Jiangsu (CN)

(72) Inventor: Zhaozeng Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/277,376

(22) PCT Filed: Jan. 28, 2022

(86) PCT No.: PCT/CN2022/074595
§ 371 (c)(1),
(2) Date: Aug. 15, 2023

(87) PCT Pub. No.: WO2023/010821
PCT Pub. Date: Feb. 9, 2023

(30) Foreign Application Priority Data

Aug. 6, 2021 (CN) .......................... 202110899261.1

(51) Int. Cl.
*H04L 61/5007* (2022.01)
*H04L 101/695* (2022.01)
*H04L 61/5069* (2022.01)

(52) U.S. Cl.
CPC ...... *H04L 61/5007* (2022.05); *H04L 61/5069* (2022.05); *H04L 2101/695* (2022.05)

(58) Field of Classification Search
None
See application file for complete search history.

(56) References Cited

U.S. PATENT DOCUMENTS 8,271,685 B1 * 9/2012 Reeves ................. H04W 72/04
455/437
2019/0014078 A1 * 1/2019 Ranta ..................... G06Q 50/01
(Continued)

FOREIGN PATENT DOCUMENTS

CN 103516817 A 1/2014
CN 104333617 A 2/2015
(Continued)

*Primary Examiner* — Angela Nguyen
(74) *Attorney, Agent, or Firm* — IPro, PLLC (57) ABSTRACT

Disclosed are a host discovery and addition method and apparatus in a data center, and a device and a medium. The method includes: scanning to discover computing nodes to be added; sending, through IPv6 multicast, a discovery message to the scanned computing nodes, and receiving discovery response messages that are sent by said computing nodes through IPv6 unicast after the discovery message passes verification; when the discovery response messages pass verification and no IP address is configured for said computing nodes, sorting BMC IPs in the discovery response messages, and allocating IP addresses according to the order of the BMC IPs, such that the IP addresses that correspond to adjacent BMC IPs are consecutive; and after the IP addresses are configured, sending an addition message to said computing nodes, receiving addition response messages, and adding said computing nodes to a data center that is managed by a management node.

20 Claims, 6 Drawing Sheets

(56) References Cited

U.S. PATENT DOCUMENTS

| | | | |
|---|---|---|---|
| 2019/0171474 A1* | 6/2019 | Malboubi | ............ H04L 61/5007 |
| 2020/0133686 A1 | 4/2020 | Lakshminarasimha et al. | |

FOREIGN PATENT DOCUMENTS

| | | | |
|---|---|---|---|
| CN | 104375860 A | 2/2015 |
| CN | 105024849 A | 11/2015 |
| CN | 109413223 A | 3/2019 |
| CN | 113347287 A | 9/2021 |

\* cited by examiner

HOST DISCOVERY AND ADDITION METHOD AND APPARATUS IN DATA CENTER, AND DEVICE AND MEDIUM

CROSS-REFERENCE TO RELATED APPLICATION

The present application claims priority to Chinese patent application No. 202110899261.1, filed on Aug. 6, 2021 before the China National Intellectual Property Administration, titled " HOST DISCOVERY AND ADDITION METHOD AND APPARATUS IN DATA CENTER, AND DEVICE AND MEDIUM", which is incorporated herein in its entirety by reference.

TECHNICAL FIELD

The present disclosure relates to the field of computer technology, in particular to a method and apparatus for discovering and adding a host in a data center, a device, and a medium.

BACKGROUND

With the increasing popularity of cloud computing technology, more and more enterprises and organizations begin to migrate their services to virtualization or hyper-converged systems. However, for installation and deployment personnel, the number of nodes in the virtualization or hyper-converged systems ranges from three to several hundred, and each node needs to be installed and deployed.

However, an existing installation process has the following deficiencies: according to the network planning method during the system installation, Internet protocol (IP) addresses are assigned to virtual machines based on a dynamic host configuration protocol (DHCP). The IP addresses acquired in this way are random. As a result, IP addresses obtained by host nodes on a cabinet are not continuous in an order in which they locate in the cabinet, which may cause difficulties in later operation and maintenance.

SUMMARY

In view of this, an object of the present disclosure is to provide a method and apparatus for discovering and adding a host in a data center, a device, and a medium. The specific solutions are as follows:

In a first aspect, the present disclosure provides a method for discovering and adding a host in a data center, applied to a management node in the data center, including:

scanning to-be-added computing nodes, wherein virtualization systems or hyper-converged systems on the management node and the to-be-added computing nodes are factory-installed;

sending a discovery message to the scanned to-be-added computing nodes through IPv6 multicast, and receiving discovery response messages sent by the to-be-added computing nodes through IPv6 unicast after the discovery message being successfully verified by the to-be-added computing nodes;

in response to determining that the discovery response messages have been successfully verified and the to-be-added computing nodes are not configured with IP addresses, sorting baseboard management controller (BMC) Internet protocols (IPs) in the discovery response messages, and assigning IP addresses to the corresponding to-be-added computing nodes based on an order of the BMC IPs, enabling the IP addresses assigned to the to-be-added computing nodes corresponding to adjacent BMC IPs to be consecutive, wherein the IP addresses are IPv4 addresses; and in response to determining that configuration of the IP addresses of the to-be-added computing nodes is completed, sending an addition message to the to-be-added computing nodes, receiving addition response messages returned by the to-be-added computing nodes after the addition message being successfully verified by the to-be-added computing nodes, and adding the to-be-added computing nodes to the data center managed by the management node.

In some embodiments, in response to receiving a message, each of the to-be-added computing nodes determines whether to respond to the received message based on a current state of a local state machine of the to-be-added computing node and a preset corresponding relationship between states of the state machine and types of response messages, wherein the message includes: the discovery message and the addition message, and the states of the state machine include a start state, a discovery state, a configuration state, an addition state, and a finish state.

In some embodiments, after the receiving discovery response messages sent by the to-be-added computing nodes through IPv6 unicast after the discovery message being successfully verified by the to-be-added computing nodes, the method further includes:

analyzing the discovery response messages to extract system information and role information about the to-be-added computing nodes from the discovery response messages, wherein the system information comprises a system type and a system version;

determining, based on the role information, whether the discovery response messages are messages sent by the computing nodes;

in response to determining that the discovery response messages are messages sent by the computing nodes, determining whether the system types of the to-be-added computing nodes are consistent with a system type of the management node;

in response to determining that the system types of the to-be-added computing nodes are consistent with the system type of the management node, determining whether the system versions of the to-be-added computing nodes are consistent with a system version of the management node; and in response to determining that the system versions of the to-be-added computing nodes are consistent with the system version of the management node, determining that the discovery response messages have been successfully verified.

In some embodiments, after the receiving discovery response messages sent by the to-be-added computing nodes through IPv6 unicast after the discovery message being successfully verified by the to-be-added computing nodes, the method further includes:

in response to determining that the discovery response messages have been successfully verified, determining whether IPv4 fields and VLAN fields in the discovery response messages are null; and in response to determining that the IPv4 fields and the VLAN fields in the discovery response messages are null, determining that the to-be-added computing nodes corresponding to the discovery response messages are not configured with IP addresses, otherwise, determining that the to-be-added computing nodes are configured with IP addresses.

In some embodiments, the assigning IP addresses to the corresponding to-be-added computing nodes based on an order of the BMC IPs, enabling the IP addresses assigned to the to-be-added computing nodes corresponding to adjacent BMC IPs to be consecutive, includes:

assigning the IP addresses to the corresponding to-be-added computing nodes based on the order of the BMC IPs, enabling the IP addresses assigned to the to-be-added computing nodes corresponding to the adjacent BMC IPs to be consecutive;

encapsulating the IP addresses, masks corresponding to the IP addresses, gateways, and virtual local area networks (VLANs) into configuration messages, and sending the configuration messages to corresponding to-be-added computing nodes through IPv6 unicast; and receiving configuration response messages sent by the to-be-added computing nodes to determine that configuration of the IP addresses of the to-be-added computing nodes is completed, wherein the configuration response messages are sent by the to-be-added computing nodes after a network is configured with the IP addresses, the masks corresponding to the IP addresses, the gateways, and the VLANs.

In some embodiments, during the sending a discovery message to the scanned to-be-added computing nodes through IPv6 multicast, the method further includes:

in response to degerming that the to-be-added computing nodes and the management node do not belong to a same network, sending the discovery message to the to-be-added computing nodes through multicast relaying of a router between the to-be-added computing nodes and the management node.

In a second aspect, the present disclosure provides a method for discovering and adding a host in a data center, applied to to-be-added computing nodes in the data center, including:

receiving a discovery message sent by a management node through IPv6 multicast after the to-be-added computing nodes are scanned by the management node, wherein virtualization systems or hyper-converged systems on the management node and the to-be-added computing nodes are factory-installed;

verifying the discovery message, and sending, when the discovery message is successfully verified, discovery response messages corresponding to the discovery message through IPv6 unicast, so that when the discovery response messages are successfully verified and the to-be-added computing nodes are not configured with IP addresses, the management node sorts BMC IPs in the discovery response messages, and assigns IP addresses to the corresponding to-be-added computing nodes based on an order of the BMC IPs, enabling the IP addresses assigned to the to-be-added computing nodes corresponding to adjacent BMC IPs to be consecutive, wherein the IP addresses are IPv4 addresses;

configuring a local network based on the IP addresses; and receiving an addition message sent by the management node, and sending addition response messages to the management node after the addition message is successfully verified, so that the management node adds the to-be-added computing nodes to the data center managed by the management node after receiving the addition response messages.

In some embodiments, the method further includes:

acquiring a current state of a local state machine in response to receiving a message, wherein the message includes the discovery message and the addition message; and determining whether to respond to the received message based on a current state of the state machine and a preset corresponding relationship between states of the state machine and types of response messages, wherein the states of the state machine include a start state, a discovery state, a configuration state, an addition state, and a finish state.

In a third aspect, the present disclosure provides an apparatus for discovering and adding a host in a data center, applied to a management node in the data center, including:

a scanning module configured to: scan to-be-added computing nodes, wherein virtualization systems or hyper-converged systems on the management node and the to-be-added computing nodes are factory-installed;

a discovering module configured to: send a discovery message to the scanned to-be-added computing nodes through IPv6 multicast, and receive discovery response messages sent by the to-be-added computing nodes through IPv6 unicast after the discovery message being successfully verified by the to-be-added computing nodes;

a configuring module configured to: sort BMC IPs in the discovery response messages when the discovery response messages are successfully verified and the to-be-added computing nodes are not configured with IP addresses, and assign IP addresses to the corresponding to-be-added computing nodes based on an order of the BMC IPs, enabling the IP addresses assigned to the to-be-added computing nodes corresponding to adjacent BMC IPs to be consecutive, wherein the IP addresses are IPv4 addresses; and an adding module configured to: send an addition message to the to-be-added computing nodes after configuration of the IP addresses of the to-be-added computing nodes is completed, receive addition response messages returned by the to-be-added computing nodes after the addition message is successfully verified by the to-be-added computing nodes, and add the to-be-added computing nodes to the data center managed by the management node.

In some embodiments, in response to receiving a message, each of the to-be-added computing nodes determines whether to respond to the received message based on a current state of a local state machine of the to-be-added computing node and a preset corresponding relationship between states of the state machine and types of response messages, wherein the message includes the discovery message and the addition message, and the states of the machine state include a start state, a discovery state, a configuration state, an addition state, and a finish state.

In a fourth aspect, the present disclosure provides an electronic device, including:

a memory and a processor, the memory is configured to store a computer program; and the processor is configured to execute the computer program to implement the method for discovering and adding a host in the data center described above.

In a fifth aspect, the present disclosure provides a computer-readable storage medium for storing a computer program, that, when executed by a processor, implements the method for discovering and adding a host in the data center described above.

BRIEF DESCRIPTION OF THE DRAWINGS

In order to more clearly illustrate technical solutions of embodiments of the present disclosure or the related art, the figures that are required to describe the embodiments or the related art will be briefly introduced below. Apparently, the figures that are described below are embodiments of the present disclosure, and those skilled in the art may obtain other figures based on these figures without paying creative work.

DETAILED DESCRIPTION

The technical solutions in the embodiments of the present disclosure will be described clearly and thoroughly below in conjunction with the accompanying drawings in the embodiments of the present disclosure. Apparently, the described embodiments are only part of the embodiments of the present disclosure, not all of them. Based on the embodiments in the present disclosure, all other embodiments obtained by those skilled in the art without paying creative work belong to the scope of protection in the present disclosure.

A current installation process has the following deficiencies: according to a network planning method during the system installation, Internet protocol (IP) addresses are assigned to virtual machines based on a dynamic host configuration protocol (DHCP). The IP addresses obtained in this way are random. As a result, IP addresses obtained by host nodes on a cabinet are not continuous in an order in which they locate in the cabinet, which may cause difficulties in later operation and maintenance. In view of this, the present disclosure provides a method for discovering and adding a host in a data center, that is capable of saving the deployment time of the data center and facilitating the later operation and maintenance.

Figure 1:
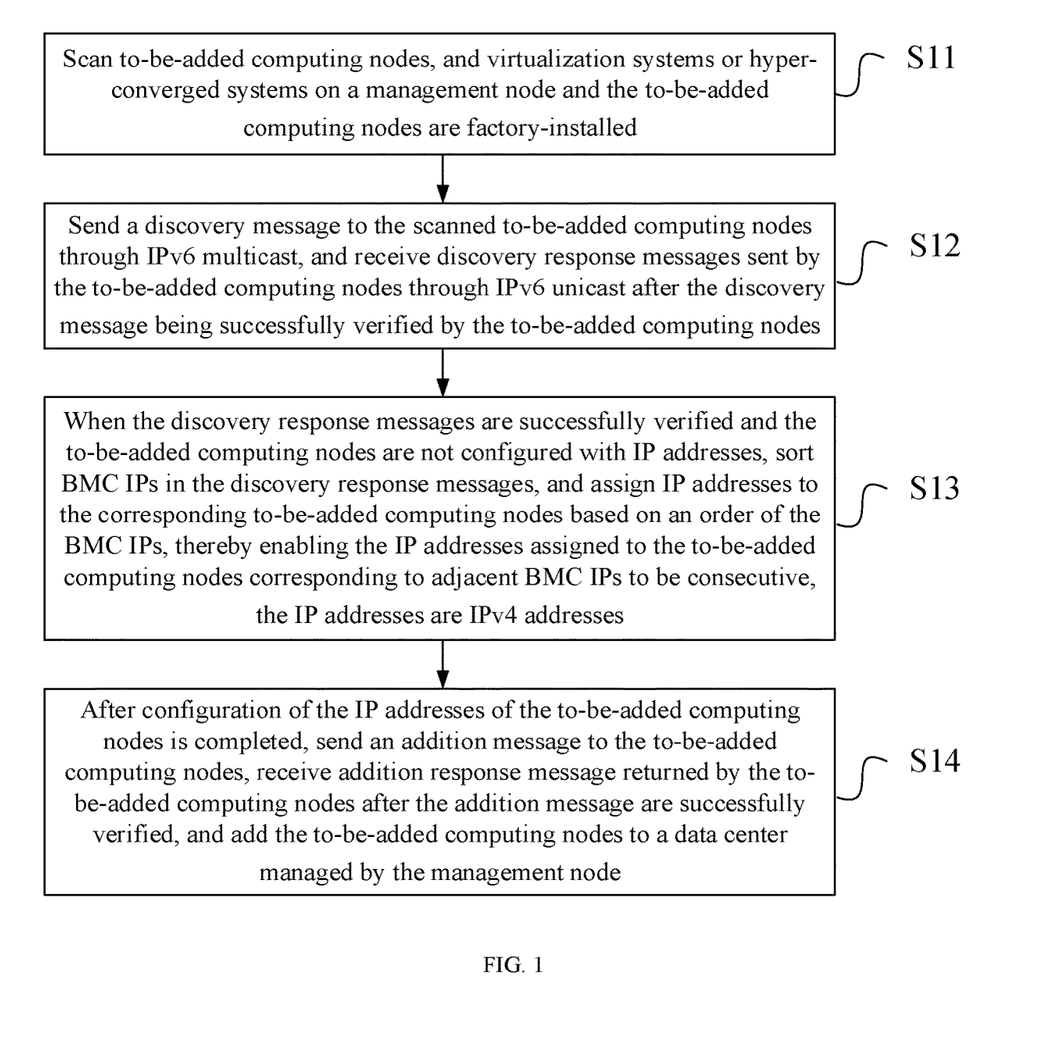
FIG. 1 is a flowchart of a method for discovering and adding a host in a data center according to the present disclosure.

Referring to FIG. 1, an embodiment of the present disclosure discloses a method for discovering and adding a host in a data center. The method is applied to a management node in the data center, and includes steps described below.

At step S11, to-be-added computing nodes are scanned, and virtualization systems or hyper-converged systems on the management node and the to-be-added computing nodes are factory-installed.

In the actual implementation process, the management node needs to scan the to-be-added computing nodes so as to discover to-be-added computing nodes that may be added. The virtualization systems or hyper-converged systems on the management node and the to-be-added computing nodes are installed before a product leaves the factory, thus it is not necessary to start the virtualization systems or hyper-converged systems on the management node and the to-be-added computing nodes after arriving at a user site and obtaining a user network plan. Therefore, the time for system deployment on the nodes may be greatly saved, that is, the deployment time of the data center may be saved.

The management node and the to-be-added computing nodes may be provided with host discovery services, so that the management node may discover the to-be-added computing nodes while scanning. The host discovery service on the to-be-added computing nodes is enabled, so that the management node may find the to-be-added computing nodes when the host discovery service on the management node is enabled to scan the to-be-added computing nodes in the data center.

At step S12, a discovery message is sent to the scanned to-be-added computing nodes through IPv6 multicast, and discovery response messages are received from the to-be-added computing nodes through IPv6 unicast after the discovery message being successfully verified by the to-be-added computing nodes.

After scanning the to-be-added computing nodes, the management node further needs to send a discovery message to the scanned to-be-added computing nodes through IPv6 multicast, and receive, through IPv6 unicast, discovery response messages sent from the to-be-added computing nodes after the discovery message being successfully verified by the to-be-added computing nodes. Since the to-be-added computing nodes may not be configured with IP addresses (the IP addresses are IPv4 addresses), the management node sends the discovery message to the to-be-added computing nodes through IPv6 multicast, and the to-be-added computing nodes send the discovery response messages to the management node through IPv6 unicast.

During the communication between the management node and the to-be-added computing nodes, a message may be used for communication. The format of the message is as follows:

{system:<ics or icr>,
Type:<DISCOVERY
/ACK_DISCOVERY/OFFER_IP/ACK_OFFER_IP/
JOIN/ACK_JOIN>
role:<com or con>,
version:<5.8.2 or 5.6.0>,
management_ipv4:<1.2.3.4>,
netmask:<255.255.255.0>,
gateway:<1.2.3.254>,
management_vlan:<100>,
bmc_ip:<3.4.5.6>
ex_info:<other info>} where the system field denotes a system type of a virtualization system or hyper-converged system of a node that sends the message; the Type field denotes a type of the message; the role field denotes a role of the node that sends the message, that is, the node that sends the message is the management node or a computing node; the version field denotes a system version of the node; management_ipv4 denotes an IP address of the node that sends the message, the IP address being an IPv4 address; netmask denotes a mask of the node that sends the message; gateway denotes a gateway of the node that sends the message; management_VLAN denotes a virtual local area network (VLAN) of the node that sends the message; bmc_ip denotes a baseboard management controller (BMC) IP of the node that sends the message; and ex_info denotes an extensible field.

That is, the management node first sends the discovery message to the scanned to-be-added computing nodes through IPv6 multicast, and the format of the discovery message is as above, with the Type field carrying the message type, that is, DISCOVERY, role field carrying the role of the node sending the message, that is, the management node con, version field carrying the version number of the system installed on the node sending the message, management_ipv4, netmask, gateway, management_VLAN denoting the IPv4 address, mask, gateway, and VLAN of the node sending the message, bmc_ip denoting an out-of-band management IP of the node, which is null in this message. In addition, ex_info is a reserved field for reserving fields that need to be carried in the future to facilitate the function expansion.

After receiving the discovery message, the to-be-added computing nodes need to perform a verification on the discovery message, and send the discovery response messages to the management node after the discovery message being successfully verified by the to-be-added computing nodes. The to-be-added computing nodes may send the discovery response messages through IPv6 unicast after the discovery message being successfully verified by the to-be-added computing nodes. The discovery response message includes: a System field carrying a system name of a to-be-added computing node that sends the message; a Type field carrying a message type, that is, ACK_DISCOVERY; role carrying a role of the node that sends the message, that is, the computing node com; version carrying a version number of the system installed on the node that sends the message; management_ipv4, netmask, gateway, and management_VLAN denoting the IPv4 address, mask, gateway, and VLAN of the node that sends the message; bmc_ip denoting an out-of-band management IP of the computing node; and ex info denoting a reserved field for reserving fields that need to be carried in the future to facilitate the function expansion. Since parameters of management_ipv4, netmask, gateway, and management_VLAN may not have been configured, these fields may be null.

Figure 2:
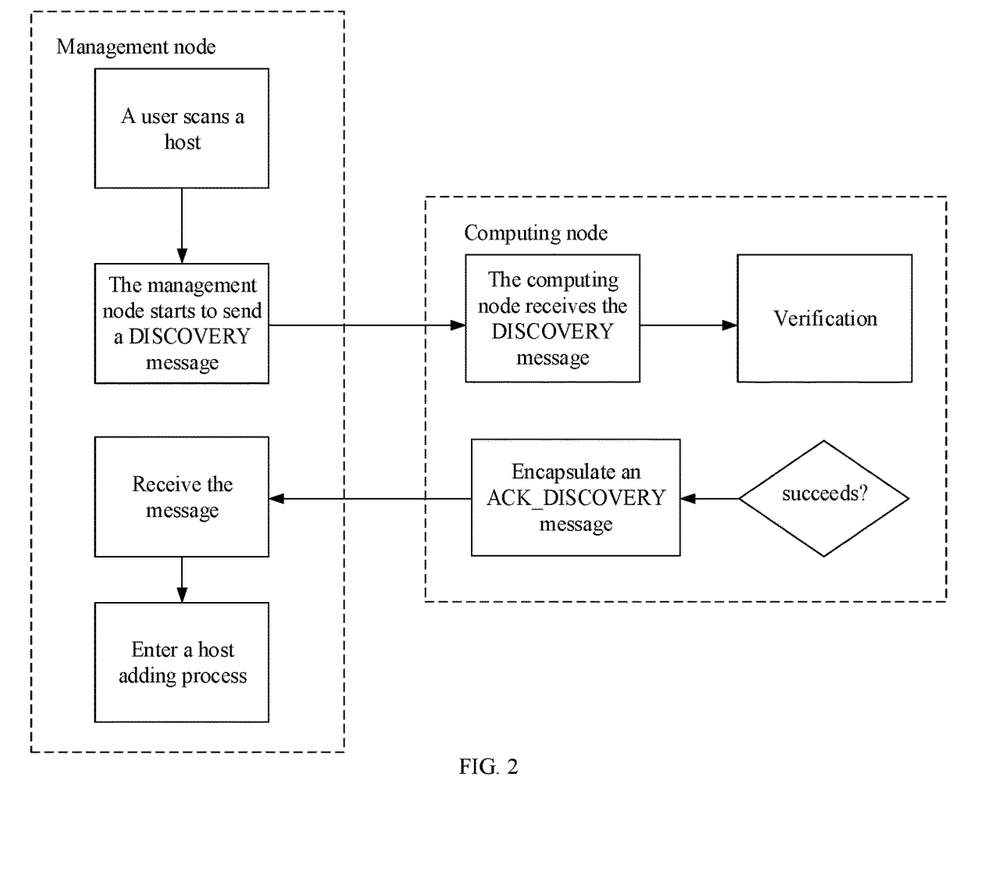
FIG. 2 is a diagram illustrating a host discovery flow according to the present disclosure.

That is, before the discovery of the to-be-added computing nodes starts, a user needs to configure a network segment to configure IP addresses for to-be-added computing nodes that are not configured with IP addresses. The size of the network segment may depend on the quantity of the to-be-added computing nodes. FIG. 2 is a diagram illustrating a host discovery flow. When the user scans the to-be-added computing nodes by the management node, the management node starts to send the discovery message that is sent in the local network in the form of an IPv6 multicast message. The to-be-added computing nodes are configured with IPv6 local addresses by default, thus all to-be-added computing nodes in the network may receive the discovery message.

After receiving the discovery message, the to-be-added computing nodes start to analyze information in the discovery message. The information includes a system type, role, and system version of the management node. Some fields, such as management_ipv4 and management_VLAN, are null in the discovery message because they are not needed by the to-be-added computing nodes in this stage. Each of the to-be-added computing nodes verifies the system type, role, and system version of the management node, the verification content including whether the system is the consistent with that of the to-be-added computing node, whether the message is sent by the management node, and whether the version of the management node is the consistent with as that of the computing node. If the discovery message fails to pass the verification, no action is performed. If the discovery message is successfully verified, for a responding to the message, an ACK_DISCOVERY message starts to be encapsulated, and source address is extracted from the received DISCOVERY message as a destination address of the ACK_DISCOVERY message, and finally the message is sent out. Information encapsulated in the message mainly includes the system type, role, and system version VLAN of a to-be-added computing node. If the to-be-added computing node has been configured with the IP address, the ACK_DISCOVERY message further includes a current IPv4 address and VLAN, and the ACK_DISCOVERY message is sent in the form of a unicast IPv6 user datagram protocol (UDP) message instead of the multicast form, because the to-be-added computing node already knows the IPv6 address of the management node. After receiving the ACK_DISCOVERY message, the management node analyzes the information in the message. The content mainly includes: the system type, role, and system version of the to-be-added computing node, and may further include the IPv4 address and VLAN of the to-be-added computing node.

At step S13, when the discovery response messages are successfully verified and the to-be-added computing nodes are not configured with IP addresses, BMC IPs in the discovery response messages are sorted, and IP addresses are assigned to the corresponding to-be-added computing nodes based on the order of the BMC IPs, so that the IP addresses assigned to the to-be-added computing nodes corresponding to adjacent BMC IPs are consecutive, and the IP addresses are IPv4 addresses.

When the discovery response messages are successfully verified, if the to-be-added computing nodes are not configured with IP addresses, the management node sorts the BMC IPs in the discovery response messages and assigns the IP addresses to the corresponding to-be-added computing nodes based on the order of the BMC IPs, so that the IP addresses assigned to the to-be-added computing nodes corresponding to the adjacent BMC IPs are consecutive, and the IP addresses are IPv4 addresses.

That is, in response to receiving the discovery response messages that are sent from the to-be-added computing nodes through IPv6 unicast after the discovery message being successfully verified by the to-be-added computing nodes, the method further includes: analyzing the discovery response messages to extract system information and role information about the to-be-added computing nodes from the discovery response messages, where the system information includes the system type and the system version; determining, based on the role information, whether the discovery response messages are messages sent by the computing nodes; in response to determining that the discovery response messages are messages sent by the computing nodes, determining whether the system types of the to-be-added computing nodes are consistent with the system type of the management node; in response to determining that the system types of the to-be-added computing nodes are consistent with the system type of the management node, determining whether the system versions of the to-be-added computing nodes are consistent with the system version of the management node; in response to determining that the system versions of the to-be-added computing nodes are consistent with the system version of the management node, determining that the discovery response messages are successfully verified.

When the discovery response message are successfully verified, it also needs to determine whether the IPv4 field and the VLAN field in the discovery response message are null. If the IPv4 field and the VLAN field in the discovery response message are null, it is determined that the to-be-added computing node corresponding to the discovery response message is not configured with an IP address, otherwise, it is determined that the to-be-added computing node is configured with an IP address.

The step of assigning the IP addresses to the corresponding to-be-added computing nodes based on the order of the BMC IPs, so that the IP addresses assigned to the to-be-added computing nodes corresponding to the adjacent BMC IPs are consecutive, includes: assigning the IP addresses to the corresponding to-be-added computing nodes based on the order of the BMC IPs, so that the IP addresses assigned to the to-be-added computing nodes corresponding to the adjacent BMC IPs are consecutive; encapsulating the IP address, gateway, VLAN and mask corresponding to the IP address into a configuration message, and sending the configuration message to the corresponding to-be-added computing node through IPv6 unicast; and receiving a configuration response message sent by the to-be-added computing node to determine that configuration of the IP address of the to-be-added computing node is completed, where the to-be-added computing node sent the configuration response message after configuring the network with the IP address, the mask corresponding to the IP address, the gateway, and the VLAN.

In the configuration message (OFFER IP message), the System field carries the system name of the management node that sends the message; the Type field carries a message type, that is, OFFER_IP; the role field carries a role of the node that sends the message, that is, the management node con; the version field carries a version number of the system installed on the node that sends the message; management_ipv4, netmask, gateway, and management_vlan here denote the IPv4 address, mask, gateway, and VLAN to be configured to the computing node by the management node, rather than the IPv4 address, mask, gateway, and vlan of the node that sends the message; bmc_ip denotes an out-of-band management IP of the node, which is null in this message; and ex_info denotes a reserved field for reserving fields that need to be carried in the future to facilitate the function expansion. In the configuration response message (ACK_OFFER_IP message), the System field carries the system name of the computing node that sends the message; the Type field carries a message type, that is, ACK_OFFER_IP; the role field carries a role of the node that sends the message, that is, the computing node com; the version field carries a version number of the system installed on the node that sends the message; management_ipv4, netmask, gateway, and management_vlan denote the IPv4 address, mask, gateway, and VLAN of the node that sends the message; bmc_ip denotes an out-of-band management IP of the computing node; and ex info denotes a reserved field for reserving fields that need to be carried in the future to facilitate the function expansion.

Figure 3:
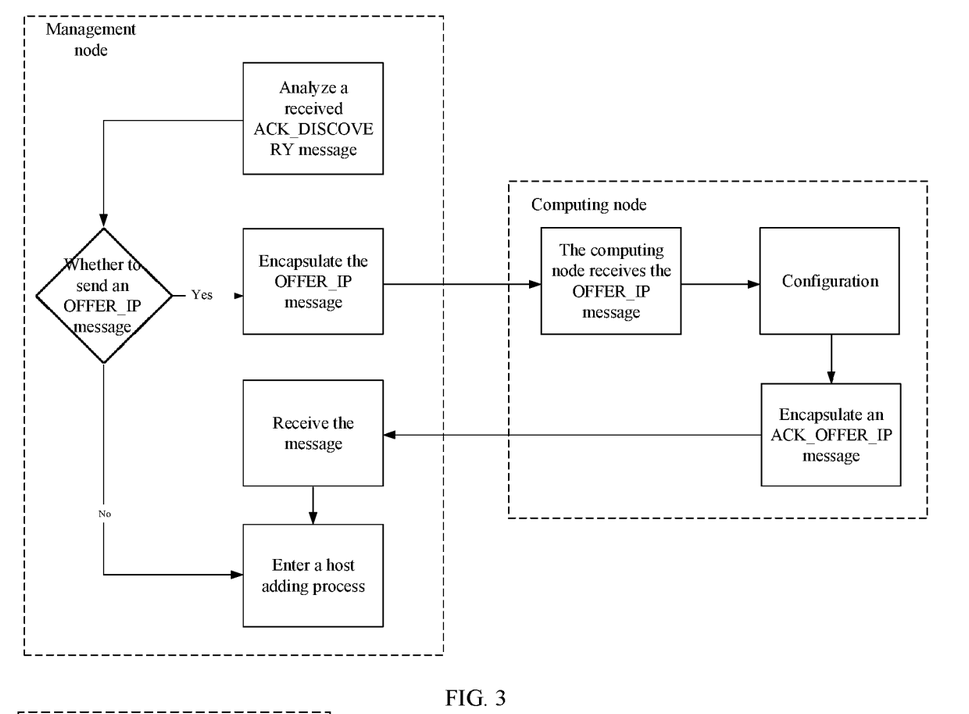
FIG. 3 is a diagram illustrating a computing node configuration flow according to the present disclosure.

That is, reference is made to FIG. 3, which is a diagram illustrating a computing node configuration flow. During the host discovery process, the management node may acquire related information of the computing nodes from the ACK_DISCOVERY messages fed back by the to-be-added computing nodes. The management node verifies the information, including the system type, role, and system version of the to-be-added computing node. After the information is successfully verified, whether the to-be-added computing node is configured with IP addresses is determined. If the to-be-added computing node is not configured with IP address, the configuration message (OFFER_IP message) starts to be encapsulated. The OFFER_IP message includes the system type and system version of the management node, and the IPv4 address, mask, gateway, and vlan to be configured for the computing node. The IP addresses are assigned to the to-be-added computing nodes in an order of the out-of-band IPs (bmc_ips) of the to-be-added computing nodes, because the out-of-band IPs of the to-be-added computing nodes are generally associated with positions on a computer cabinet and are consecutive. In this way, the consecutiveness of the computing nodes may be ensured. The OFFER_IP message is sent in the form of an IPv6 unicast UDP message, because the management node already knows the IPv6 unicast address of each to-be-added computing node during the discovery process of the to-be-added computing nodes.

After receiving the message, based on the type of the message, the to-be-added computing node may know that the message is an OFFER_IP message for configuring the to-be-added computing node, then the IPv4 address and vlan need to be extracted from the message to start the configuration. After the configuration is completed, the configuration response message (ACK_OFFER_IP message) starts to be assembled, and the ACK_OFFER_IP message is used for informing the management node that the configuration of the to-be-added computing node has been completed. The ACK_OFFER_IP message also carries information about the system type, system version, IPv4 address, mask, gateway, vlan, etc. of the to-be-added computing node, which is similar to the ACK_DISCOVERY message. The difference is that the IPv4 address and vlan here are non-null. In this case, the IP information of the to-be-added computing node has been configured.

At step S14, after the configuration of the IP address of the to-be-added computing node is completed, an addition message is sent to the to-be-added computing node, an addition response message that is returned by the to-be-added computing node after the addition message being successfully verified by the to-be-added computing node is received, and the to-be-added computing node is added to the data center managed by the management node.

After the configuration of the IP address of the to-be-added computing node is completed, that is, after the management node receives the configuration response message, which indicates completion of the configuration of the IP address of the to-be-added computing node, the management node may send the addition message to the to-be-added computing node, and receive the addition response message that is returned by the to-be-added computing node after the addition message being successfully verified by the to-be-added computing node, and add the to-be-added computing node to the data center managed by the management node.

In the addition message (JOIN message), the System field carries the system name of the management node that sends the message; the Type field carries a message type, that is, JOIN; the role field carries a role that sends the message, that is, the management node con; the version field carries a version number of a system installed on the management node that sends the message; management_ipv4, netmask, gateway, and management_vlan here denote the IPv4 address, mask, gateway, and vlan of the management node; bmc_ip denotes an out-of-band management IP of the management node, which is null in the addition message; and ex_info denotes a reserved field for reserving fields that need to be carried in the future to facilitate the function expansion.

In the addition response message (ACK_JOIN message), the System field carries a system name of the to-be-added computing node that sends the message; the Type field carries a message type, that is, ACK_JOIN; the role field carries a role that sends the message, that is, the computing node com; the version field carries a version number of the system installed on the to-be-added computing node that sends the message; management_ipv4, netmask, gateway, and management_vlan denote the IPv4 address, mask, gateway, and VLAN of the to-be-added computing node that sends the message; bmc_ip denotes an out-of-band management IP of the to-be-added computing node; and ex_info denotes a reserved field for reserving fields that need to be carried in the future to facilitate the function expansion.

Figure 4:
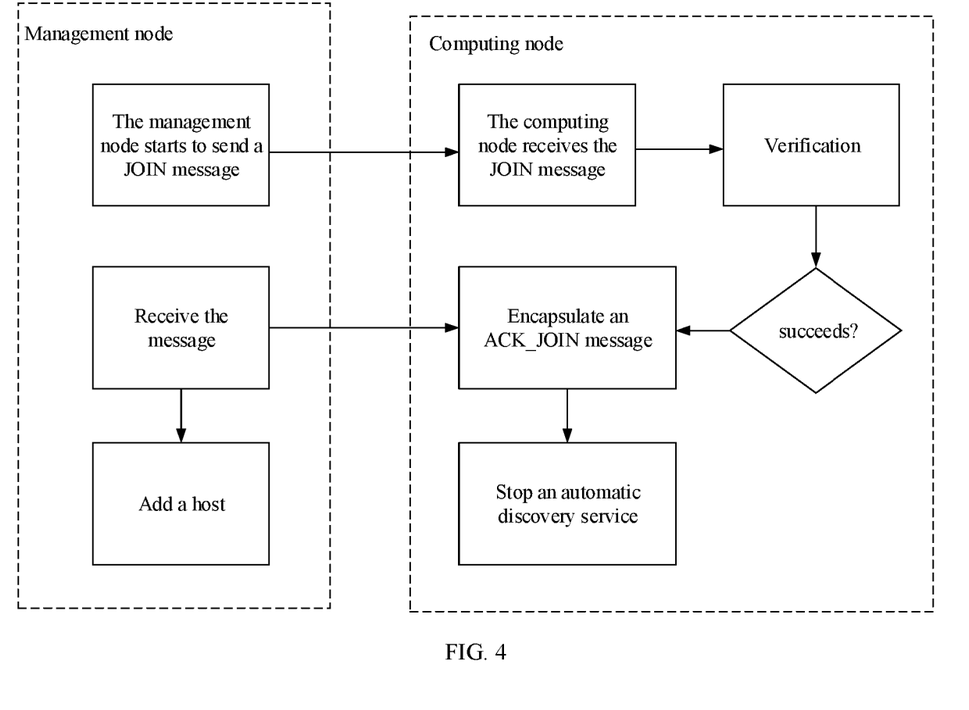
FIG. 4 is a diagram illustrating a host addition flow according to the present disclosure.

That is, reference is made to FIG. 4, which is a diagram illustrating a host addition flow. After performing the two processes of discovery and configuration of the to-be-added computing nodes, the management node has confirmed that the verified information of the to-be-added computing nodes is correct, and the configuration information is complete. In this case, the management node sends the JOIN message to invite the to-be-added computing nodes to join the data center. After receiving the invitation, the to-be-added computing nodes may start a verification, the verification information including the system type, role, and system version of the management node. The second verification is made because other management nodes may send verification to the to-be-added computing nodes at any time, and the to-be-added computing nodes need to confirm that the data center which the to-be-added computing nodes are to join matches the versions of the to-be-added computing nodes. After joining the data center, the to-be-added computing nodes do not respond to DISCOVERY, OFFER_IP, and JOIN messages from any other management node (if any), and an automatic discovery service of the to-be-added computing nodes may also stop. After receiving the ACK_JOIN messages of the to-be-added computing nodes, the management node starts to manage the to-be-added computing nodes and control resources provided by the to-be-added computing nodes.

In the actual implementation process, the management node and the to-be-added computing nodes may not belong to the same network, that is, the system of the management node communicates with the systems of the to-be-added computing nodes through a router. In this case, the process of sending the discovery message to the scanned to-be-added computing nodes through IPv6 multicast further includes: if the to-be-added computing node and the management node do not belong to the same network, the discovery message is sent to the to-be-added computing node by means of multicast relaying of a router between the to-be-added computing node and the management node.

That is, when the management node and the to-be-added computing node do not belong to the same network, it is necessary to enable the multicast relaying function of the router between the management node and the to-be-added computing node, so as to forward the message multicasted by the management node through IPv6 to the corresponding to-be-added computing node through the router.

Figure 5:
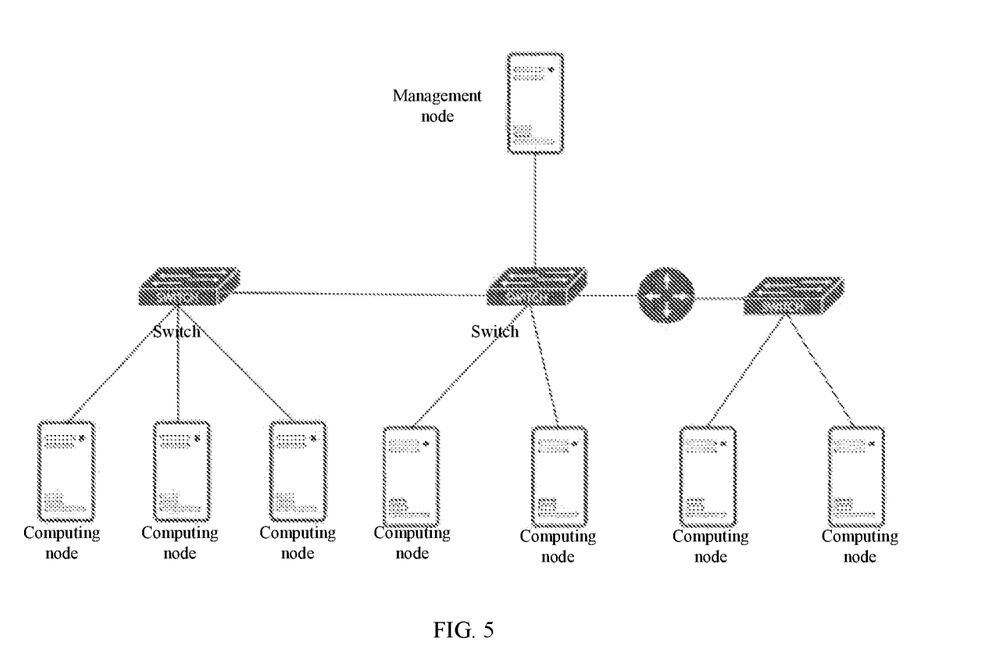
FIG. 5 is a schematic diagram illustrating an application environment of a method for discovering and adding a host in a data center according to the present disclosure.

FIG. 5 is a schematic diagram of an application environment of the method for discovering and adding a host in a data center. The figure shows a management node and computing nodes. The computing nodes that communicate with the management node directly through switches are in the same network as the management node. The computing nodes that may communicate with the management node only through a router (denoted by a circular graph in FIG. 5) are not in the same network as the management node, so the multicast relaying function of the router needs to be enabled. After the multicast relaying function of the router is enabled, the preceding steps may be carried out normally.

As can be seen, the present disclosure is applied to the management node in the data center. The management node scans to-be-added computing nodes, and the virtualization systems or hyper-converged systems on the management node and the to-be-added computing nodes are factory-installed. Then, the management node sends the discovery message to the scanned to-be-added computing nodes through IPv6 multicast, and receives the discovery response messages that are sent by the to-be-added computing nodes through IPv6 unicast after the discovery message being successfully verified by the to-be-added computing nodes. When the discovery response messages are successfully verified and the to-be-added computing nodes are not configured with IP addresses, the BMC IPs in the discovery response messages are sorted, and the IP addresses are assigned to the corresponding to-be-added computing nodes based on the order of the BMC IPs, so that the IP addresses assigned to the to-be-added computing nodes corresponding to the adjacent BMC IPs are consecutive, and the IP addresses are IPv4 addresses. Next, after configuration of the IP addresses of the to-be-added computing nodes is completed, the management node sends the addition message to the to-be-added computing node, and receives the addition response message that is returned by the to-be-added computing node after the addition message are successfully verified by the to-be-added computing nodes, and adds the to-be-added computing node to the data center managed by the management node. As can be seen, the virtualization systems or hyper-converged systems on the management node and the computing nodes in the disclosure are factory-installed, and thus do not need to be deployed after arriving at a user site and obtaining a user network plan. Therefore, the time for system deployment on the nodes may be greatly saved, that is, the deployment time of the data center may be saved. When assigning the IP addresses to the to-be-added computing nodes, the management node first sorts the BMC IPs of the computing nodes, and then assigns the IP addresses to the corresponding to-be-added computing nodes based on the order of the BMC IPs, thereby enabling the IP addresses assigned to the to-be-added computing nodes corresponding to the adjacent BMC IPs to be consecutive. Since the BMC IPs indicate an order of the computing nodes in a cabinet, the IP addresses assigned to the connected computing nodes may also be consecutive, which is conducive to later operation and maintenance.

Figure 6:
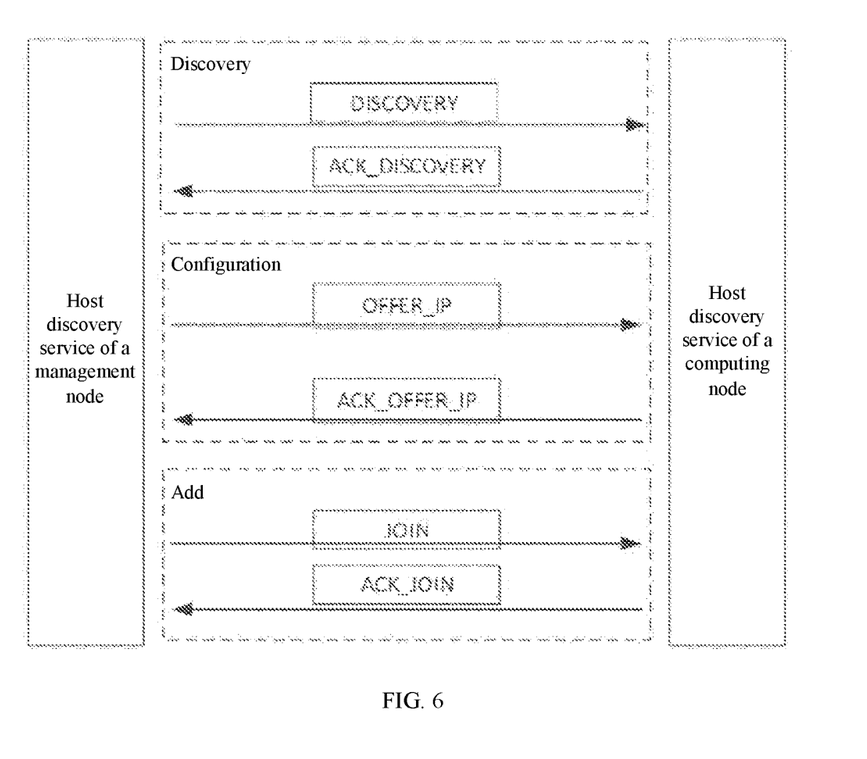
FIG. 6 is a diagram illustrating an interaction between a management node and to-be-added computing nodes according to the present disclosure.

Reference is made to FIG. 6, which is a diagram illustrating an interaction between the management node and the to-be-added computing nodes. In the process of host discovery and addition in the data center, the host discovery service on the management node and the host discovery services on the to-be-added computing nodes require interactive communications of three stages, including discovery stage, configuration stage, and addition stage. In the discovery stage, the management node sends the discovery message to the scanned to-be-added computing nodes through IPv6 multicast, and receives the discovery response messages (ACK_DISCOVERY message) that are sent by the to-be-added computing nodes through IPv6 unicast after the discovery message being successfully verified by the to-beadded computing nodes. In the configuration stage, when the discovery response messages are successfully verified and the to-be-added computing nodes are not configured with IP address, the management node sorts the BMC IPs in the discovery response messages and assigns the IP addresses to the corresponding to-be-added computing nodes based on the order of the BMC IPs, thereby enabling the IP addresses assigned to the to-be-added computing nodes corresponding to the adjacent BMC IPs to be consecutive, and the IP addresses are IPv4 addresses. The assigned IP addresses are sent to the corresponding to-be-added computing nodes through the configuration message (OFFER_IP message), and the management node receives the configuration response messages (ACK_OFFER_IP messages) that are sent by the to-be-added computing nodes after configuration of the IP addresses is completed. In the addition stage, the management node sends the addition message (JOIN message) to the to-be-added computing nodes, and receives the addition response messages (ACK_JOIN messages) that are returned by the to-be-added computing nodes when the addition message are successfully verified by the to-be-added computing nodes, and adds the to-be-added computing nodes to the data center managed by the management node.

Figure 7:
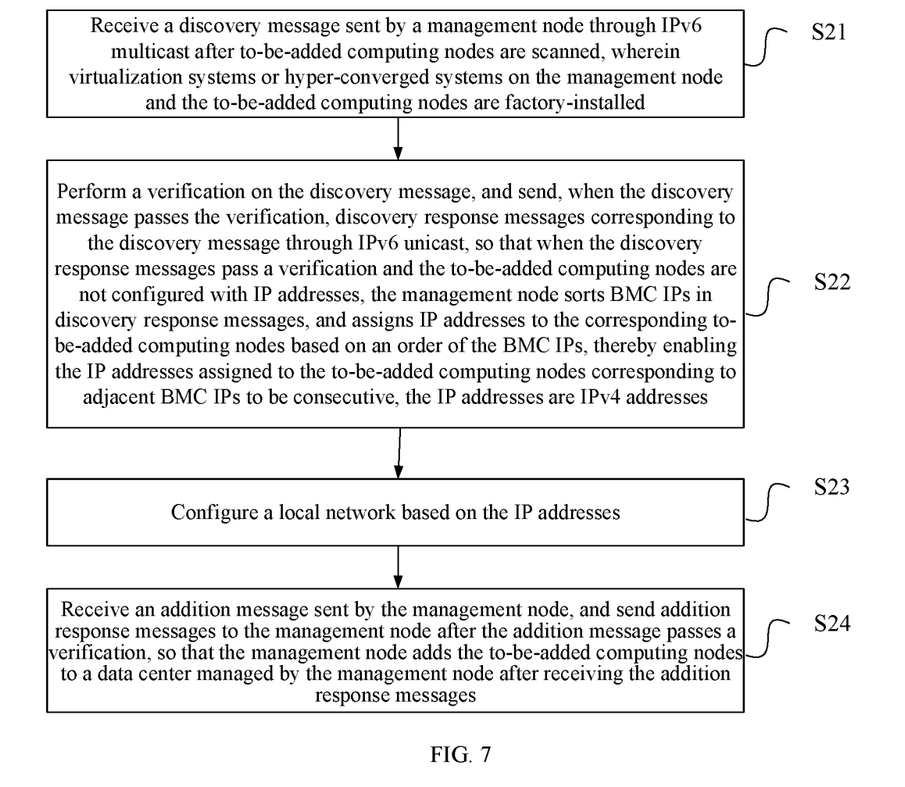
FIG. 7 is a flowchart of a method for discovering and adding a host in a data center according to the present disclosure.

Referring to FIG. 7, an embodiment of the disclosure discloses a specific method for discovering and adding a host in a data center. The method is applied to to-be-added computing nodes in the data center, and the method includes steps below.

At step S21, the to-be added computing nodes receive a discovery message that is sent by a management node through IPv6 multicast after the to-be-added computing nodes being scanned by the management node, and virtualization systems or hyper-converged systems on the management node and the to-be-added computing nodes are factory-installed.

The management node may send the discovery message to the scanned to-be-added computing nodes through IPv6 multicast, and accordingly, the to-be-added computing nodes need to receive the discovery message. The virtualization systems or hyper-converged systems on the management node and the to-be-added computing nodes are factory-installed, thereby saving time for installing the virtualization systems or hyper-converged systems based on a customer network plan after arriving at a customer site.

At step S22, the discovery message is verified, and when the discovery message is successfully verified, discovery response messages corresponding to the discovery message are sent through IPv6 unicast, so that when the discovery response messages are successfully verified and the to-be-added computing nodes are not configured with IP addresses, the management node sorts BMC IPs in the discovery response messages, and assigns IP addresses to the corresponding to-be-added computing nodes based on an order of the BMC IPs, thereby enabling the IP addresses assigned to the to-be-added computing nodes corresponding to adjacent BMC IPs to be consecutive, and the IP addresses are IPv4 addresses.

The to-be-added computing nodes verify the discovery message, and send the discovery response messages corresponding to the discovery message through IPv6 unicast when the discovery message is successfully verified by the to-be-added computing nodes. After receiving the discovery response messages, the management node verifies the discovery response messages, sorts, when the discovery response messages are successfully verified and the to-be-added computing nodes are not configured with IP addresses, the BMC IPs in the discovery response messages, and assigns the IP addresses to the corresponding to-be-added computing nodes based on the order of the BMC IPs, thereby enabling the IP addresses assigned to the to-be-added computing nodes corresponding to the adjacent BMC IPs to be consecutive, and the IP addresses are IPv4 addresses.

At step S23, the IP addresses are used to configure a local network.

Accordingly, the to-be-added computing nodes need to use the IP addresses to configure the local network, so as to be managed by the management node and normally provide services to the outside.

At step S24, the to-be-added computing nodes receive an addition message sent from the management node, and after the addition message being successfully verified, the to-be-added computing nodes send addition response messages to the management node, so that the management node adds the to-be-added computing nodes to the data center managed by the management node after receiving the addition response messages.

When determining that configuration of the IP addresses of the to-be-added computing nodes is completed, the management node may send the addition message to the to-be-added computing nodes. Accordingly, the to-be-added computing nodes need to receive the addition messages and verify the addition messages, and send the addition response messages to the management node after the addition messages being successfully verified, so that the management node adds the to-be-added computing nodes to the data center managed by the management node after receiving the addition response messages.

Since communication messages may be lost during the process, which disturbs processing when the to-be-added computing nodes receive unmatched messages in different stages, a state machine is run on the to-be-added computing nodes to ensure the smooth progress of the above process. Therefore, the to-be-added computing nodes acquire a current state of a local state machine when receiving a message, wherein the message includes the discovery message, the configuration message, and the addition message; and whether to respond to the received message is determined based on the current state of the state machine and a preset corresponding relationship between states of the state machine and types of response messages, wherein the states of the state machine include a start state, a discovery state, a configuration state, an addition state, and a finish state. The preset corresponding relationship between the states of the state machine and the types of the response messages is as follows: an initial state of the to-be-added computing nodes is the start state, in this case, only the DISCOVERY message is processed. After the to-be-added computing nodes receive the DISCOVERY message, the state is migrated to the DISCOVERY state, in this case, only the OFFER_IP message or the JOIN message is processed. After the to-be-added computing nodes receive the OFFER_IP message, the state is migrated to the OFFER_IP state, in this case, only the JOIN message is processed. The JOIN state may be migrated from the OFFER_IP state or the DISCOVERY state, corresponding to two cases where the configuration information of the computing nodes is modified or not modified respectively. In the JOIN state, messages of any state need to be processed, that is, the computing nodes need to respond to messages of any type even if being in the JOIN state, but the JOIN state remains unchanged, and only a timer is refreshed. After it is sensed that the to-be-added computing nodes have joined the data center managed by the management node, the state of the to-be-added computing nodes is migrated to the finish state, and no message is processed. Timers are correspondingly provided for the DISCOVERY state, the OFFER_IP state, and the JOIN state, and may return to the start state if the state is not migrated within a specified period of time.

Figure 8:
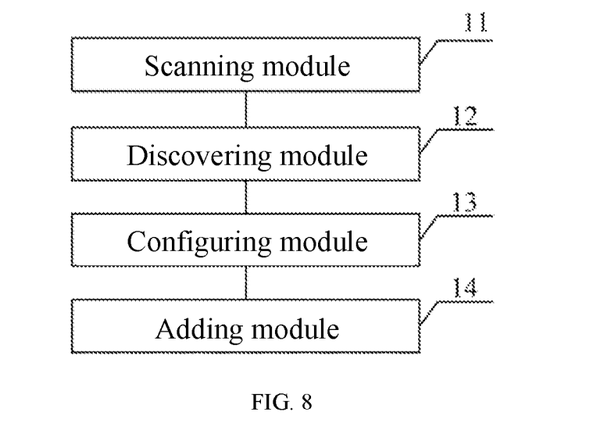
FIG. 8 is a schematic structural diagram of an apparatus for discovering and adding a host in a data center according to the present disclosure.

Referring to FIG. 8, an embodiment of the present disclosure discloses an apparatus for discovering and adding a host in a data center. The apparatus is applied to a management node in the data center, and includes a scanning module 11, a discovering module 12, a configuring module 13 and an adding module 14.

The scanning module 11 is configured to scan to-be-added computing nodes, and virtualization systems or hyper-converged systems on the management node and the to-be-added computing nodes are factory-installed.

The discovering module 12 is configured to: send a discovery message to the scanned to-be-added computing nodes through IPv6 multicast, and receive discovery response messages that are sent from the to-be-added computing nodes through IPv6 unicast after the discovery message being successfully verified by the to-be-added computing nodes.

The configuring module 13 is configured to: sort, when the discovery response messages are successfully verified and the to-be-added computing nodes are not configured with IP addresses, BMC IPs in the discovery response messages, and assign IP addresses to the corresponding to-be-added computing nodes based on an order of the BMC IPs, thereby enabling the IP addresses assigned to the to-be-added computing nodes corresponding to adjacent BMC IPs to be consecutive, and the IP addresses are IPv4 addresses.

The adding module 14 is configured to: send, after configuration of the IP addresses of the to-be-added computing nodes is completed, an addition message to the to-be-added computing nodes, receive addition response messages returned by the to-be-added computing nodes after the addition message is successfully verified, and add the to-be-added computing nodes to the data center managed by the management node.

As can be seen, the present disclosure is applied to the management node in the data center. The apparatus scans the to-be-added computing nodes, and the virtualization systems or hyper-converged systems on the management node and the to-be-added computing nodes are factory-installed. Then, the apparatus sends the discovery message to the scanned to-be-added computing nodes through IPv6 multicast, and receives the discovery response messages that are sent by the to-be-added computing nodes through IPv6 unicast after the discovery message being successfully verified by the to-be-added computing nodes. When the discovery response messages are successfully verified and the to-be-added computing nodes are not configured with IP addresses, the apparatus sorts the BMC IPs in the discovery response messages, and assigns the IP addresses to the corresponding to-be-added computing nodes based on the order of the BMC IPs, thereby enabling the IP addresses assigned to the to-be-added computing nodes corresponding to the adjacent BMC IPs to be consecutive, and the IP addresses are IPv4 addresses. Next, after configuration of the IP addresses of the to-be-added computing nodes is completed, the apparatus sends the addition message to the to-be-added computing nodes, receives the addition response messages returned by the to-be-added computing nodes after the addition message is successfully verified, and adds the to-be-added computing nodes to the data center managed by the management node. As can be seen, the virtualization systems or hyper-converged systems on the management node and the computing nodes in the disclosure are factory-installed, and thus it is not necessary to start deployment of the virtualization systems or hyper-converged systems on the management node and the computing node after arriving at a user site and obtaining a user network plan. Therefore, the time for system deployment on the nodes may be greatly saved, that is, the deployment time of the data center may be saved. When assigning the IP addresses to the to-be-added computing nodes, the management node first sorts the BMC IPs of the computing nodes, and then assigns the IP addresses to the corresponding to-be-added computing nodes based on the order of the BMC IPs, thereby enabling the IP addresses assigned to the to-be-added computing nodes corresponding to the adjacent BMC IPs to be consecutive. Since the BMC IPs indicate an order of the computing nodes in a cabinet, the IP addresses assigned to the connected computing nodes may also be consecutive, which is conducive to later operation and maintenance.

In some specific implementations, the configuring module 13 is configured to:

analyze the discovery response messages to extract system information and role information about the to-be-added computing nodes from the discovery response messages, and the system information includes a system type and a system version;

determine, based on the role information, whether the discovery response messages are messages sent by the computing nodes;

in response determining that the discovery response messages are messages sent by the computing nodes, determine whether the system types of the to-be-added computing nodes are consistent with a system type of the management node;

in response to determining that the system types of the to-be-added computing nodes are consistent with the system type of the management node, determine whether the system versions of the to-be-added computing nodes are consistent with a system version of the management node; and in response to determining that the system versions of the to-be-added computing nodes are consistent with the system version of the management node, determine that the discovery response messages are successfully verified.

In some specific implementations, the configuring module 13 is configured to:

determine whether IPv4 fields and VLAN fields in the discovery response messages are null, in response to determining that the discovery response messages are successfully verified; and in response to determining that the IPv4 fields and the VLAN fields in the discovery response messages are null, determine that the to-be-added computing nodes corresponding to the discovery response messages are not configured with IP addresses, otherwise, determine that the to-be-added computing nodes are configured with IP addresses.

In some specific implementations, the configuring module 13 is configured to:

assign the IP addresses to the corresponding to-be-added computing nodes based on the order of the BMC IPs, so that the IP addresses assigned to the to-be-added computing nodes corresponding to the adjacent BMC IPs are consecutive;

encapsulate the IP addresses, masks corresponding to the IP addresses, gateways, and VLANs into configuration messages, and send the configuration messages to the corresponding to-be-added computing nodes through IPv6 unicast; and receive configuration response messages sent by the to-be-added computing nodes, and determine that configuration of the IP addresses of the to-be-added computing nodes is completed, wherein the to-be-added computing nodes sent the configuration response messages after performing network configuration with the IP addresses, the masks corresponding to the IP addresses, the gateways, and the VLANs.

In some specific implementations, the discovering module 12 is configured to:

in response to determining that the to-be-added computing nodes and the management node do not belong to the same network, send the discovery message to the to-be-added computing nodes by means of multicast relaying of a router between the to-be-added computing nodes and the management node.

Figure 9:
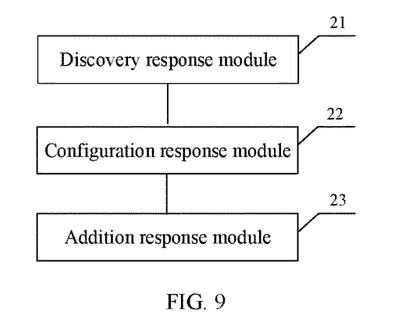
FIG. 9 is a schematic structural diagram of an apparatus for discovering and adding a host in a data center according to the present disclosure.

Referring to FIG. 9, an embodiment of the present disclosure discloses an apparatus for discovering and adding a host in a data center. The apparatus is applied to to-be-added computing nodes in the data center, and includes a discovery response module 21, a configuration response module 22, and an addition response module 23.

The discovery response module 21 is configured to: receive a discovery message that is sent by a management node through IPv6 multicast after the to-be-added computing nodes are scanned, and virtualization systems or hyper-converged systems on the management node and the to-be-added computing nodes are factory-installed.

The discovery response module 21 is configured to: perform a verification on the discovery message, and send, when the discovery message is successfully verified, a discovery response message corresponding to the discovery message through IPv6 unicast. Therefore, when the discovery response messages are successfully verified and the to-be-added computing node is not configured with IP address, the management node sorts BMC IPs in the discovery response messages, and assigns IP addresses to the corresponding to-be-added computing nodes based on an order of the BMC IPs, thereby enabling the IP addresses assigned to the to-be-added computing nodes corresponding to adjacent BMC IPs to be consecutive, and the IP addresses are IPv4 addresses.

The configuration response module 22 is configured to: configure a local network based on the IP address.

The addition response module 23 is configured to: receive an addition message sent by the management node, and send an addition response message to the management node after the addition message is successfully verified, so that the management node adds the to-be-added computing node to the data center managed by the management node after receiving the addition response messages.

In some specific implementations, the apparatus for discovering and adding a host in the data center further includes:

a determining module configured to: acquire, when a message is received, a current state of a local state machine, wherein the message includes the discovery message and the addition message; and determine whether to respond to the received message based on the current state of the state machine and a preset corresponding relationship between states of the state machine and types of response messages, wherein the states of the state machine include a start state, a discovery state, a configuration state, an addition state, and a finish state.

Figure 10:
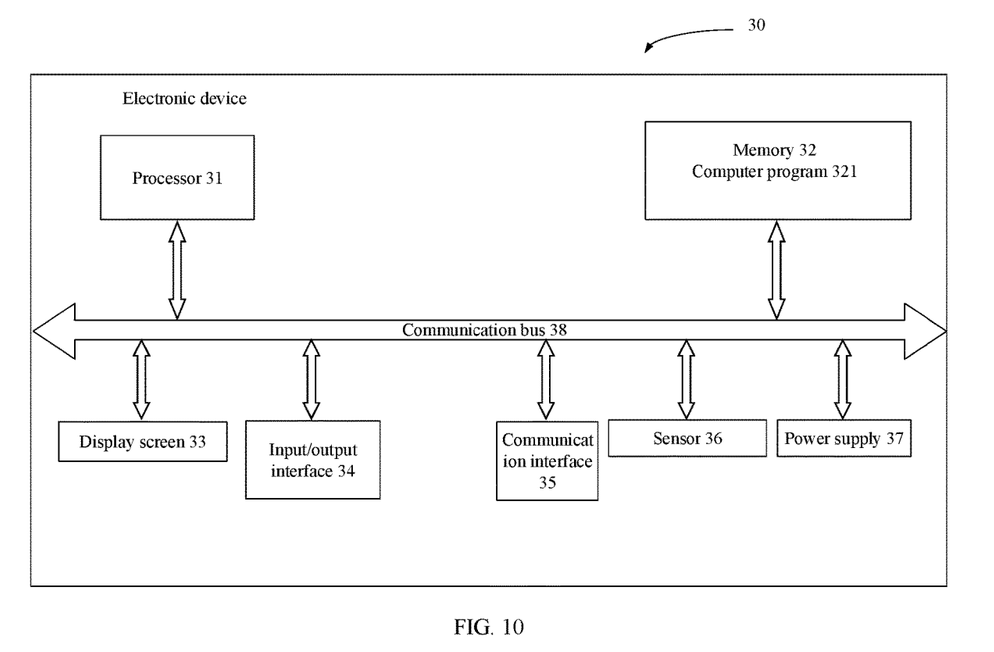
FIG. 10 is a schematic structural diagram of an electronic device according to the present disclosure.

FIG. 10 is a schematic structural diagram of an electronic device 30 according to an embodiment of the present disclosure. The electronic device 30 may implement the steps of the aforementioned method for host discovery and addition in the data center.

Generally, the electronic device 30 in this embodiment includes: a processor 31 and a memory 32.

The processor 31 may include one or more processing cores, for example, a 4-core processor or an 8-core processor. The processor 31 may be implemented by at least one hardware of a digital signal processing (DSP), a field-programmable gate array (FPGA), and a programmable logic array (PLA). The processor 31 may further include a main processor and a co-processor. The main processor is a processor for processing data in a wake-up state, also referred to as a central processing unit (CPU). The co-processor is a low-power processor for processing data in a standby mode. In some embodiments, the processor 31 may be integrated with a graphics processing unit (GPU), and the GPU is configured to render and draw images that a display screen needs to display. In some embodiments, the processor 31 may include an artificial intelligence (AI) processor, and the AI processor is configured to process computing operations related to machine learning.

The memory 32 may include one or more computer-readable storage media which may be non-transient. The memory 32 may further include a high-speed random access memory, and a non-volatile memory, for example, one or more disk storage devices and flash storage devices. In this embodiment, the memory 32 is at least configured to store the following computer program 321. The computer program, after being loaded and executed by the processor 31, is capable of implementing the steps of the method for host discovery and adding in the data center according to any one of the foregoing embodiments.

In some embodiments, the electronic device 30 may further include a display screen 33, an input/output interface 34, a communication interface 35, a sensor 36, a power supply 37, and a communication bus 38.

A person skilled in the art may appreciate that the structure shown in FIG. 10 is not to be construed as limiting the electronic device 30, and more or fewer components than illustrated may be included.

Alternatively, the embodiments of the disclosure further disclose a computer-readable storage medium configured to store a computer program. The computer program, when executed by a processor, implements the method for host discovery and adding in the data center according to any one of the foregoing embodiments.

The specific process regarding the above method for host discovery and adding in the data center may be referred to the corresponding contents disclosed in the foregoing embodiments, which will not be repeated herein.

Various embodiments in the specification are described in a progressive manner, each embodiment focuses on the difference from other embodiments, and the same and similar parts of various embodiments can be referred to each other. Since the apparatus disclosed in the embodiments corresponds to the method disclosed in the embodiments, the description thereof is relatively simple, and for relevant details, please refer to the description of the method.

The steps of the methods or algorithms described in connection with the embodiments disclosed herein may be directly implemented by hardware, software modules executed by a processor, or a combination of both. Software modules can be placed in random access memory (RAM), internal memory, read-only memory (ROM), electrically programmable ROM, electrically erasable programmable ROM, registers, hard disk, removable disk, CD-ROM, or any other storage medium known in the technical field.

It should also be noted that relational terms such as "first", "second" as used herein are merely used to distinguish an object or operation from another object or operation, and are not necessarily used to describe or imply that such an actual relationship or sequence exists between these objects and operations. Furthermore, the terms "comprising" and "having", as well as any variations thereof, are intended to cover a non-exclusive inclusion, e.g. a process, method or apparatus comprising a series of steps or elements is not necessarily limited to those elements explicitly listed, but may include other elements not explicitly listed or inherent to the process, method or apparatus.

The method and apparatus for discovering and adding a host in a data center, device and medium provided by the application have been described in detail above. Herein, specific examples are used to illustrate the principles and implementation methods of the present application. The descriptions of the above embodiments are only used to help understand the method and core idea of the application; meanwhile, for those skilled in the art, there will be changes in the specific implementation and scope of application based on the core idea of the application. In summary, the content of the specification should not be construed as limiting the present application.

The invention claimed is:

1. A method for discovering and adding a host in a data center, applied to a management node in the data center, comprising:
    scanning to-be-added computing nodes, wherein virtualization systems or hyper-converged systems on the management node and the to-be-added computing nodes are factory-installed;
    sending a discovery message to the scanned to-be-added computing nodes through IPv6 multicast, and receiving discovery response messages that are sent by the to-be-added computing nodes through IPv6 unicast after the discovery message being successfully verified by the to-be-added computing nodes;
    in response to determining that the discovery response messages have been successfully verified and the to-be-added computing nodes are not configured with IP addresses, sorting baseboard management controller (BMC) Internet protocols (IPs) in the discovery response messages, and assigning IP addresses to the corresponding to-be-added computing nodes based on an order of the BMC IPs, enabling the IP addresses assigned to the to-be-added computing nodes corresponding to adjacent BMC IPs to be consecutive, wherein the IP addresses are IPv4 addresses; and
    in response to determining that configuration of the IP addresses of the to-be-added computing nodes is completed, sending an addition message to the to-be-added computing nodes, receiving addition response messages returned by the to-be-added computing nodes after the addition message being successfully verified by the to-be-added computing nodes, and adding the to-be-added computing nodes to the data center managed by the management node.

2. The method for discovering and adding a host in a data center according to claim 1, wherein in response to receiving a message, determining, by each of the to-be-added computing nodes, whether to respond to the received message based on a current state of a local state machine of the to-be-added computing node and a preset corresponding relationship between states of the state machine and types of response messages, wherein the message comprises: the discovery message and the addition message, and the states of the state machine comprise a start state, a discovery state, a configuration state, an addition state, and a finish state.

3. The method for discovering and adding a host in a data center according to claim 1, wherein after the receiving discovery response messages that are sent by the to-be-added computing nodes through IPv6 unicast after the discovery message being successfully verified by the to-be-added computing nodes, the method further comprises:
    analyzing the discovery response messages to extract system information and role information about the to-be-added computing nodes from the discovery response messages, wherein the system information comprises a system type and a system version;
    determining, based on the role information, whether the discovery response messages are messages sent by the computing nodes;
    in response to determining that the discovery response messages are messages sent by the computing nodes, determining whether the system types of the to-be-added computing nodes are consistent with a system type of the management node;
    in response to determining that the system types of the to-be-added computing nodes are consistent with the system type of the management node, determining whether the system versions of the to-be-added computing nodes are consistent with a system version of the management node; and
    in response to determining that the system versions of the to-be-added computing nodes are consistent with the system version of the management node, determining that the discovery response messages have been successfully verified.

4. The method for discovering and adding a host in a data center according to claim 1, wherein after the receiving discovery response messages that are sent by the to-be-added computing nodes through IPv6 unicast after the discovery message being successfully verified by the to-be-added computing nodes, the method further comprises:
    in response to determining that the discovery response messages have been successfully verified, determining whether IPv4 fields and VLAN fields in the discovery response messages are null; and
    in response to determining that the IPv4 fields and the VLAN fields in the discovery response messages are null, determining that the to-be-added computing nodes corresponding to the discovery response messages are not configured with IP addresses, otherwise, determining that the to-be-added computing nodes are configured with IP addresses.

5. The method for discovering and adding a host in a data center according to claim 1, wherein the assigning IP addresses to the corresponding to-be-added computing nodes based on an order of the BMC IPs, enabling the IP addresses assigned to the to-be-added computing nodes corresponding to adjacent BMC IPs to be consecutive, comprises:
    assigning the IP addresses to the corresponding to-be-added computing nodes based on the order of the BMC IPs, enabling the IP addresses assigned to the to-be-added computing nodes corresponding to the adjacent BMC IPs to be consecutive;
    encapsulating the IP addresses, masks corresponding to the IP addresses, gateways, and virtual local area networks (VLANs) into configuration messages, and sending the configuration messages to corresponding to-be-added computing nodes through IPv6 unicast; and receiving configuration response messages sent by the to-be-added computing nodes to determine that configuration of the IP addresses of the to-be-added computing nodes is completed, wherein the configuration response messages are sent by the to-be-added computing nodes after a network is configured with the IP addresses, the masks corresponding to the IP addresses, the gateways, and the VLANs.

6. The method for discovering and adding a host in a data center according to claim 1, wherein during the sending a discovery message to the scanned to-be-added computing nodes through IPv6 multicast, the method further comprises:

in response to degerming that the to-be-added computing nodes and the management node do not belong to a same network, sending the discovery message to the to-be-added computing nodes through multicast relaying of a router between the to-be-added computing nodes and the management node.

7. A method for discovering and adding a host in a data center, applied to to-be-added computing nodes in the data center, comprising:

receiving a discovery message sent by a management node through IPv6 multicast after the to-be-added computing nodes are scanned by the management node, wherein virtualization systems or hyper-converged systems on the management node and the to-be-added computing nodes are factory-installed;

verifying the discovery message, and sending, when the discovery message is successfully verified, discovery response messages corresponding to the discovery message through IPv6 unicast, so that when the discovery response messages are successfully verified and the to-be-added computing nodes are not configured with IP addresses, the management node sorts BMC IPs in the discovery response messages, and assigns IP addresses to the corresponding to-be-added computing nodes based on an order of the BMC IPs, enabling the IP addresses assigned to the to-be-added computing nodes corresponding to adjacent BMC IPs to be consecutive, wherein the IP addresses are IPv4 addresses;

configuring a local network based on the IP addresses; and receiving an addition message sent by the management node, and sending addition response messages to the management node after the addition message is successfully verified, so that the management node adds the to-be-added computing nodes to the data center managed by the management node after receiving the addition response messages.

8. The method for discovering and adding a host in a data center according to claim 7, further comprising:

acquiring a current state of a local state machine in response to receiving a message, wherein the message comprises the discovery message and the addition message; and determining whether to respond to the received message based on a current state of the state machine and a preset corresponding relationship between states of the state machine and types of response messages, wherein the states of the state machine comprise a start state, a discovery state, a configuration state, an addition state, and a finish state.

9. An electronic device, comprising:

a memory and a processor, wherein the memory is configured to store a computer program; and the processor is configured to execute the computer program to implement operations of:

scanning to-be-added computing nodes, wherein virtualization systems or hyper-converged systems on a management node and the to-be-added computing nodes are factory-installed:

sending a discovery message to the scanned to-be-added computing nodes through IPv6 multicast, and receiving discovery response messages that are sent by the to-be-added computing nodes through IPv6 unicast after the discovery message being successfully verified by the to-be-added computing nodes;

in response to determining that the discovery response messages have been successfully verified and the to-be-added computing nodes are not configured with IP addresses, sorting baseboard management controller (BMC) Internet protocols (IPs) in the discovery response messages, and assigning IP addresses to the corresponding to-be-added computing nodes based on an order of the BMC IPs, enabling the IP addresses assigned to the to-be-added computing nodes corresponding to adjacent BMC IPs to be consecutive, wherein the IP addresses are IPv4 addresses; and in response to determining that configuration of the IP addresses of the to-be-added computing nodes is completed, sending an addition message to the to-be-added computing nodes, receiving addition response messages returned by the to-be-added computing nodes after the addition message being successfully verified by the to-be-added computing nodes, and adding the to-be-added computing nodes to the data center managed by the management node.

10. A non-transient computer-readable storage medium for storing a computer program, that, when executed by a processor, implements the method for discovering and adding a host in the data center according to claim 1.

11. The method for discovering and adding a host in a data center according to claim 1, wherein the management node and the to-be-added computing nodes are provided with host discovery services that cause the management node to discover the to-be-added computing nodes.

12. The method for discovering and adding a host in a data center according to claim 1, wherein at least one of the discovery message, the discovery response message and the addition message comprises: a system field denoting a system type of the virtualization system or hyper-converged system of a node sending the message; a type field denoting a type of the message; a role field denoting a role of the node sending the message; a version field denoting a system version of the node; management_ipv4 denoting an IP address of the node sending the message, the IP address being an IPv4 address; netmask denoting a mask of the node sending the message; gateway denoting a gateway of the node sending the message; management_VLAN denoting a virtual local area network (VLAN) of the node sending the message; bmc_ip denoting a baseboard management controller (BMC) IP of the node sending the message; and ex_info denoting an extensible field.

13. The method for discovering and adding a host in a data center according to claim 1, further comprising providing a network segment to configure IP addresses for to-be-added computing nodes that are not configured with IP addresses.

14. The method for discovering and adding a host in a data center according to claim 2, wherein the preset corresponding relationship between states of the state machine and types of response messages is as follows: when the to-be-added computing node is in the start state, the to-be-added computing node only responds to the discovery message; when the to-be-added computing node is in the discovery state, the to-be-added computing node only responds to the addition message; when the to-be-added computing node is in the addition state, the to-be-added computing node responds to any one of the discovery message or the addition message.

15. The electronic device according to claim 9, wherein the processor is further configured to execute the computer program to implement operations of:
  in response to receiving a message, determining, by each of the to-be-added computing nodes, whether to respond to the received message based on a current state of a local state machine of the to-be-added computing node and a preset corresponding relationship between states of the state machine and types of response messages, wherein the message comprises:
  the discovery message and the addition message, and the states of the state machine comprise a start state, a discovery state, a configuration state, an addition state, and a finish state.

16. The electronic device according to claim 9, wherein the processor is further configured to execute the computer program to implement operations of:
  analyzing the discovery response messages to extract system information and role information about the to-be-added computing nodes from the discovery response messages, wherein the system information comprises a system type and a system version;
  determining, based on the role information, whether the discovery response messages are messages sent by the computing nodes;
  in response to determining that the discovery response messages are messages sent by the computing nodes, determining whether the system types of the to-be-added computing nodes are consistent with a system type of the management node;
  in response to determining that the system types of the to-be-added computing nodes are consistent with the system type of the management node, determining whether the system versions of the to-be-added computing nodes are consistent with a system version of the management node; and
  in response to determining that the system versions of the to-be-added computing nodes are consistent with the system version of the management node, determining that the discovery response messages have been successfully verified.

17. The electronic device according to claim 9, wherein the processor is further configured to execute the computer program to implement operations of:
  in response to determining that the discovery response messages have been successfully verified, determining whether IPv4 fields and VLAN fields in the discovery response messages are null; and
  in response to determining that the IPv4 fields and the VLAN fields in the discovery response messages are null, determining that the to-be-added computing nodes corresponding to the discovery response messages are not configured with IP addresses, otherwise, determining that the to-be-added computing nodes are configured with IP addresses.

18. The electronic device according to claim 9, wherein the processor is further configured to execute the computer program to implement operations of:
  assigning the IP addresses to the corresponding to-be-added computing nodes based on the order of the BMC IPs, enabling the IP addresses assigned to the to-be-added computing nodes corresponding to the adjacent BMC IPs to be consecutive;
  encapsulating the IP addresses, masks corresponding to the IP addresses, gateways, and virtual local area networks (VLANs) into configuration messages, and sending the configuration messages to corresponding to-be-added computing nodes through IPv6 unicast; and
  receiving configuration response messages sent by the to-be-added computing nodes to determine that configuration of the IP addresses of the to-be-added computing nodes is completed, wherein the configuration response messages are sent by the to-be-added computing nodes after a network is configured with the IP addresses, the masks corresponding to the IP addresses, the gateways, and the VLANs.

19. The electronic device according to claim 9, wherein the processor is further configured to execute the computer program to implement operations of:
  in response to degerming that the to-be-added computing nodes and the management node do not belong to a same network, sending the discovery message to the to-be-added computing nodes through multicast relaying of a router between the to-be-added computing nodes and the management node.

20. The method for discovering and adding a host in a data center according to claim 8, wherein the preset corresponding relationship between states of the state machine and types of response messages is as follows: when the to-be-added computing node is in the start state, the to-be-added computing node only responds to the discovery message; when the to-be-added computing node is in the discovery state, the to-be-added computing node only responds to the addition message; when the to-be-added computing node is in the addition state, the to-be-added computing node responds to any one of the discovery message or the addition message.

* * * * *